(12) United States Patent
Rosenberger et al.

(10) Patent No.: US 12,099,234 B2
(45) Date of Patent: Sep. 24, 2024

(54) METHODS FOR PRODUCING A HOLLOW-CORE FIBER AND FOR PRODUCING A PREFORM FOR A HOLLOW-CORE FIBER

(71) Applicant: HERAEUS QUARZGLAS GMBH & CO. KG, Hanau (DE)

(72) Inventors: Manuel Rosenberger, Hanau (DE); Michael Hünermann, Hanau (DE); Martin Trommer, Hanau (DE); Kay Schuster, Hanau (DE); Steffen Weimann, Hanau (DE)

(73) Assignee: HERAEUS QUARZGLAS GMBH & CO. KG, Hanau (DE)

( * ) Notice: Subject to any disclaimer, the term of this patent is extended or adjusted under 35 U.S.C. 154(b) by 440 days.

(21) Appl. No.: 17/625,560

(22) PCT Filed: Jul. 15, 2020

(86) PCT No.: PCT/EP2020/070013
§ 371 (c)(1),
(2) Date: Jan. 7, 2022

(87) PCT Pub. No.: WO2021/009236
PCT Pub. Date: Jan. 21, 2021

(65) Prior Publication Data
US 2022/0291443 A1    Sep. 15, 2022

(30) Foreign Application Priority Data
Jul. 17, 2019    (EP) .................................... 19186865

(51) Int. Cl.
*G02B 6/02*    (2006.01)
*C03B 37/012*    (2006.01)
*C03B 37/027*    (2006.01)

(52) U.S. Cl.
CPC .... *G02B 6/02328* (2013.01); *C03B 37/01245* (2013.01); *C03B 37/02781* (2013.01);
(Continued)

(58) Field of Classification Search
None
See application file for complete search history.

(56) References Cited

U.S. PATENT DOCUMENTS

2003/0172682 A1* 9/2003 Sato .................... C03B 37/0122
65/393
2003/0230118 A1 12/2003 Dawes et al.
(Continued)

FOREIGN PATENT DOCUMENTS

| CN | 1837868 A | 9/2006 |
|---|---|---|
| CN | 114127022 A | 3/2022 |

(Continued)

OTHER PUBLICATIONS

Office Action issued Mar. 3, 2023 in CN Application No. 2020800436245 (with English Summary).
(Continued)

*Primary Examiner* — Chris H Chu
(74) *Attorney, Agent, or Firm* — Panitch Schwarze Belisario & Nadel LLP

(57) ABSTRACT

Methods are known for producing an anti-resonant hollow-core fiber which has a hollow core extending along a fiber longitudinal axis and an inner jacket region that surrounds the hollow core, said jacket region comprising multiple anti-resonant elements. The known methods have the steps of: providing a cladding tube that has a cladding tube inner bore and a cladding tube longitudinal axis along which a cladding tube wall extends that is delimited by an interior and an exterior; providing a number of tubular anti-resonant element preforms; arranging the anti-resonant element pre-
(Continued)

Figure 1:
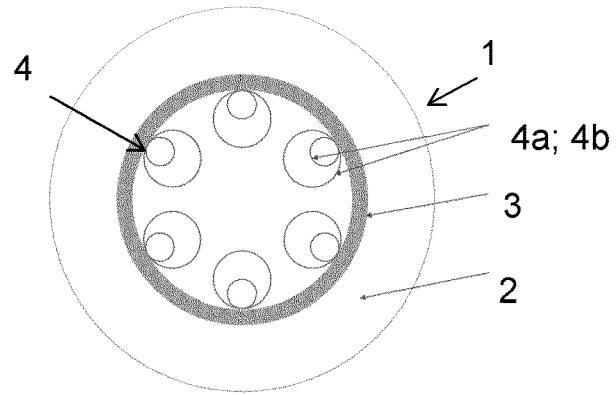

forms at target positions of the interior of the cladding tube wall, thereby forming a primary preform which has a hollow core region and an inner jacket region; and elongating the primary preform in order to form the hollow-core fiber or further processing the primary preform in order to form a secondary preform. The aim of the invention is to achieve a high degree of precision and an exact positioning of the anti-resonant elements in a sufficiently stable and reproducible manner on the basis of the aforementioned methods. This is achieved in that while further processing the primary preform according to step (c), an external layer cylinder is used which has a radial viscosity profile such that the viscosity increases towards the interior of the external layer cylinder.

20 Claims, 1 Drawing Sheet

(52) U.S. Cl.
CPC ...... *G02B 6/02347* (2013.01); *C03B 2201/12* (2013.01); *C03B 2203/16* (2013.01)

(56) References Cited

U.S. PATENT DOCUMENTS

| | | | |
|---|---|---|---|
| 2004/0096173 A1 | 5/2004 | Fekety et al. | |
| 2005/0226578 A1 | 10/2005 | Mangan et al. | |
| 2006/0046075 A1 | 3/2006 | Maul et al. | |
| 2006/0130528 A1 | 6/2006 | Nelson et al. | |
| 2006/0216527 A1 | 9/2006 | Fletcher, III | |
| 2008/0310806 A1 | 12/2008 | Mukasa | |
| 2009/0019893 A1 | 1/2009 | Bogdahn | |
| 2011/0044596 A1* | 2/2011 | Zhang ............. | G02B 6/03633 385/124 |
| 2013/0336343 A1 | 12/2013 | Miyabe et al. | |
| 2017/0075147 A1* | 3/2017 | Gutsche ............. | G02B 6/024 |
| 2022/0267193 A1 | 8/2022 | Rosenberger et al. | |

FOREIGN PATENT DOCUMENTS

| | | |
|---|---|---|
| DE | 102004054392 A1 | 3/2006 |
| DE | 102005028219 B3 | 10/2006 |
| DE | 102014011041 A1 | 1/2016 |
| EP | 3136143 A1 | 3/2017 |
| GB | 2566466 A | 3/2019 |
| WO | 02/072489 A2 | 9/2002 |
| WO | 2018/169487 A1 | 9/2018 |
| WO | 2019/008352 A1 | 1/2019 |

OTHER PUBLICATIONS

International Search Report and Written Opinion mailed Sep. 16, 2020 by the European Patent Office in its capacity as International Searching Authority for counterpart international patent application No. PCT/EP2020/070013 (with English translations attached).

Jasion, Gregory T. et al, "Fabrication of tubular anti-resonant hollow core fibers: modelling, draw dynamics and process optimization" Optics Express vol. 27, No. 15, pp. 20567-20582, Jul. 2019 (DOI: 10.1364/OE.27.020567).

Kosolapov, A.F. et al, "Hollow-core revolver fibre with a double-capillary reflective cladding" Quantum Electronics 46 (3) Mar. 29, 2016 pp. 267-270 (DOI: 10.1070/QEL15972).

Nawazuddin, M.B.S. et al, "Lotus Shaped Negative Curvature Hollow Core Fibre with 10.5 dB/km at 1550 nm Wavelength" 2017 European Conference on Optical Communication (ECOC), IEEE, (2017) pp. 1-3 (DOI: 10.1109/ECOC.2017.8346101).

Poletti, Francesco "Nested antiresonant nodeless hollow core fiber," Optics Express, vol. 22, No. 20 (2014) pp. 23807-23828 (DOI:10.1364/OE 22.023807).

Sherlock, Ben et al., "Tunable fibre-coupled multiphoton microscopy with a negative curvature fibre" Journal of Biophotonics, vol. 9, No. 7, pp. 715-720, (2016) (DOI: 10.1002/jbio.201500290).

Yu, Fei, "Chapter 4—Fabrication of hollow core negative curvature fibre" IN "Hollow core negative curvature fibres" University of Bath PhD. pp. 59-74, Dec. 31, 2013 (XP055656461).

* cited by examiner

METHODS FOR PRODUCING A HOLLOW-CORE FIBER AND FOR PRODUCING A PREFORM FOR A HOLLOW-CORE FIBER

TECHNICAL BACKGROUND

The invention relates to a method for producing an anti-resonant hollow-core fiber comprising a hollow core extending along a longitudinal axis of the fiber and a sheath region surrounding the hollow core, which sheath region comprises a plurality of anti-resonance elements, comprising the method steps of:
(a) providing a primary preform for a hollow-core fiber which comprises at least one cladding tube having a cladding tube inner bore and a cladding tube longitudinal axis along which a cladding tube wall delimited by an inner side and an outer side extends,
(b) forming a number of precursors or preforms for anti-resonance elements at desired positions on the cladding tube wall, and
(c) further processing the primary preform to form a secondary preform from which the hollow-core fiber is drawn, the further processing comprising a single or repeated collapse of additional sheathing material in the form of a collecting cylinder, the collecting cylinder having a collecting cylinder inner side facing the cladding tube, a collecting cylinder outer side and a collecting cylinder wall therebetween.

The invention also relates to a method for producing a preform for an anti-resonant hollow-core fiber comprising a hollow core extending along a longitudinal axis of the fiber and a sheath region surrounding the hollow core, which sheath region comprises a plurality of anti-resonance elements, comprising the method steps of:
(a) providing a primary preform for a hollow-core fiber which comprises at least one cladding tube having a cladding tube inner bore and a cladding tube longitudinal axis along which a cladding tube wall delimited by an inner side and an outer side extends,
(b) forming a number of precursors or preforms for anti-resonance elements at desired positions on the cladding tube wall, and
(c) further processing the primary preform to form a secondary preform for the hollow-core fiber, the further processing comprising a single or repeated collapse of additional sheathing material in the form of a collecting cylinder, the collecting cylinder having a collecting cylinder inner side facing the cladding tube, a collecting cylinder outer side and a collecting cylinder wall therebetween.

Conventional single-mode optical fibers made of solid material have a core region made of glass, which is surrounded by a sheath region made of glass with a lower refractive index. Light guidance is based thereby on total reflection between the core and the sheath regions. However, the interactions of the guided light with the solid material are associated with an increased latency in data transmission and relatively low damage thresholds with respect to high-energy radiation.

These disadvantages are prevented or reduced by "hollow-core fibers" in which the core comprises an evacuated cavity filled with gas or liquid. In hollow-core fibers, the interaction of the light with the glass is less than in solid core fibers. The refractive index of the core is less than that of the sheath, so that light guidance by total reflection is not possible and the light would normally escape from the core into the sheath. As a function of the physical mechanism of the light guidance, hollow-core fibers are divided into "photonic bandgap fibers" and "anti-resonance reflection fibers."

In the case of "photonic bandgap fibers," the hollow core region is surrounded by a sheath in which small hollow channels are arranged periodically. On the basis of semiconductor technology, the periodic structure of the hollow channels in the sheath brings about the effect referred to as the "photonic bandgap," according to which light of certain wavelength ranges scattered at the sheath structures can constructively interfere due to Bragg reflection in the central cavity and cannot propagate transversely in the sheath.

In the embodiment of the hollow-core fiber referred to as "anti-resonant hollow-core fiber" (ARHCF), the hollow core region is surrounded by an inner sheath region in which so-called "anti-resonant elements" (or "anti-resonance elements," "AREs" for short) are arranged. The walls of the anti-resonance elements evenly distributed around the hollow core can act as Fabry-Perot cavities operated in anti-resonance, which reflect the incident light and guide it through the fiber core.

This fiber technology promises a low optical attenuation, a very broad transmission spectrum (even in the UV or IR wavelength ranges) and a low latency in data transmission.

Potential applications of the hollow-core fibers lie in the fields of data transmission, high-power beam guidance, for example for material processing, modal filtering, non-linear optics, in particular for super-continuum generation, from the ultraviolet to infrared wavelength range.

PRIOR ART

A disadvantage of anti-resonant hollow-core fibers is that higher-order modes are not necessarily suppressed, so that they are often not exclusively single-mode over long transmission lengths and the quality of the output beam deteriorates.

In the paper by Francesco Poletti "Nested antiresonant nodeless hollow core fiber," Optics Express, vol. 22, no. 20 (2014), DOI: 10.1364/OE 22.023807, a fiber design is proposed, with which anti-resonance elements are not designed as a simple singular structural element, but are composed of several nested structural elements. The nested anti-resonance elements are designed such that higher-order core modes, but not the fundamental core mode, are phase-matched to the sheath modes and are suppressed. As a result, the propagation of the fundamental core mode is always ensured, and the hollow-core fiber can be effectively single-mode over a limited wavelength range.

Effective mode suppression depends on the center wavelength of the transmitted light and on the structural parameters of the fiber design, such as the radius of the hollow core and the difference in the diameters of nested ring structures in the anti-resonance elements.

EP 3 136 143 A1 discloses an anti-resonant hollow-core fiber (referred to therein as "hollow-core fiber of non-bandgap type"), with which the core can conduct further modes in addition to the fundamental mode. For this purpose, it is surrounded by an inner sheath having "non-resonant elements," which provide a phase-matching of anti-resonant modes with the higher modes. The hollow-core fiber is produced according to what is known as a "stack-and-draw technique", by arranging the starting elements to form an axially parallel ensemble and fixing them to form a preform and then elongating the preform. In this case, a cladding tube with a hexagonal inner cross-section is used, and six so-called "ARE preforms" (anti-resonance element preforms) are fixed in the inner edges of the cladding tube. This preform is drawn in two stages to form a hollow-core fiber.

WO 2018/169487 A1 discloses a method for producing a preform for anti-resonant hollow-core fibers, with which a first sheath region comprises a plurality of rods and a second sheath region comprises a plurality of tubes surrounded by an outer cladding tube. Rods, tubes, and cladding tube are joined to form a preform by means of the "stack and draw" technique. Before the preform is elongated, the preform end is sealed, which is done by applying a sealing compound. For example, a UV adhesive is used as the sealing compound.

TECHNICAL OBJECT

Anti-resonant hollow-core fibers, and in particular those with nested structural elements, have complex internal geometries, which makes it difficult for them to be produced exactly and reproducibly. This applies all the more because, if the resonance or anti-resonance conditions are to be maintained, even small variations in dimensions in the order of magnitude of the operating wavelength of the light to be guided cannot be tolerated. Deviations from the desired geometry can be caused by the configuration of the fiber preform, and they can also occur through undesired deformations that are not true to scale in the fiber drawing process.

In the known "stack and draw" technique, many elements are to be joined together with positional accuracy. For example, in order to produce the hollow-core fiber known from the aforementioned paper in the "NANF" design, six anti-resonance element preforms, each consisting of an anti-resonance element outer tube (ARE outer tube, for short) and an anti-resonance element inner tube welded on one side to the inner lateral surface of the ARE outer tube (ARE inner tube, for short) must be attached to the inner side of a cladding tube.

In order to achieve low attenuation values and broad transmission ranges, the azimuthal position of the anti-resonance elements within the cladding tube is also important in addition to a uniform wall thickness of the walls of the anti-resonance elements. This cannot be easily achieved with the "stack and draw" technique. The aim of the invention is to specify a method for the cost-effective production of an anti-resonant hollow-core fiber that avoids the limitations of conventional production methods.

In particular, it is the object of the invention to provide a method for producing an anti-resonant hollow-core fiber and a preform for anti-resonant hollow-core fibers, with which a high precision of the structural elements and an exact positioning of the anti-resonance elements in the fiber can be reproducibly achieved in a sufficiently stable and reproducible manner.

Moreover, disadvantages of the classic "stack and draw" technique, with which the required structural accuracies, in particular a uniform wall thickness of the anti-resonance elements and exact positioning at predetermined azimuthal positions, is not easy to achieve, are to be avoided if at all possible.

SUMMARY OF THE INVENTION

With regard to the production of the anti-resonant hollow-core fiber, this object is achieved according to the invention starting from a method of the species mentioned at the outset in that In order to further process the primary preform according to method step (c), a collecting cylinder is used which has a radial viscosity profile in which viscosity increases toward the collecting cylinder inner side.

The starting point for producing the anti-resonant hollow-core fiber is a preform referred to herein as a "primary preform." It comprises a cladding tube in which or on which precursors or preforms for the shaping of anti-resonant elements are contained in the hollow-core fibers (referred to here as "anti-resonance elements" for short). The primary preform can be elongated to form the hollow-core fiber; however, as a rule, the primary preform is further processed to produce therefrom a preform referred to herein as a "secondary preform." Optionally, the hollow-core fiber is produced by elongating the secondary preform. Alternatively, the primary preform or the secondary preform is surrounded by a collecting cylinder or a plurality of collecting cylinders to form a coaxial ensemble of components, and the coaxial ensemble is elongated directly to form the hollow-core fiber. The general term "preform" is understood here to mean that component or that coaxial ensemble of components from which the hollow-core fiber is ultimately drawn.

The addition of sheath material is accomplished, for example, by collapsing a collecting cylinder onto the primary preform. The coaxial arrangement of primary preform and collecting cylinder is elongated or is not elongated when the collecting cylinder collapses. The anti-resonance element preforms here are changed in their shape or arrangement, or they are not changed in their shape or arrangement The implementation of one of the hot-forming processes mentioned in method step (c) (hereinafter also referred to as "thermal processing") can lead to deformation and structural deviation of the desired fiber geometry. This is especially the case if both thick-walled and delicate preform components made of the same material are situated close to one another or adjoin one another.

This is because the necessary processing temperature is usually determined by the component with the greatest surface area; this is typically the outer lateral surface of the preform. Smaller components (such as the anti-resonance element preforms and their individual structural elements) are subject to greater deformation at the same temperature. Since, during thermal processing, the preform is heated in the heating zone from the outside to the inside, a radial temperature profile with a minimum in the preform center arises over the preform volume. This can aggravate the aforementioned deformation problem if delicate components are arranged at a preform radius which is closer to the heating zone than a less delicate component, which is regularly the case with preforms for anti-resonant hollow-core fibers.

The viscosity of single-component glass, especially quartz glass, can be changed by means of doping. By using materials with a different doping and thus an adapted viscosity, structure retention can be ensured during thermal processing. The doping allows the viscosities of adjacent preform components to be adjusted. It can be used in particular to reduce the thermal stability of a component in favor of the stability of an adjacent component.

However, when a collecting cylinder is used to encompass a primary preform, a step-like viscosity change can occur at the contact surface between the primary preform and the collecting cylinder. These abrupt changes can lead to internal mechanical stresses in the finished (secondary) preform and in the final hollow-core fiber which negatively influence both optical and mechanical properties. These include deviation of optical parameters from the design properties (refractive index fluctuation due to mechanical stress) as well as an increasing tendency to fracture.

In particular, the invention aims at enabling the use of differently doped starting materials for the starting cylinder and the cladding tube in order to counteract a deformation, in particular of delicate structural elements during thermal processing but without thereby negatively influencing the optical and mechanical properties of fiber and preform. A higher accuracy of the geometric shape and the positioning of the anti-resonance elements in the hollow-core fiber is thereby to be achieved.

For this purpose, at least the collecting cylinder, and preferably also the cladding tube, has a dopant concentration gradient toward the common contact surface. In the case of the collecting cylinder, this is achieved by having a radial viscosity profile in which viscosity increases toward the inside of the collecting cylinder.

This makes it possible to maintain viscosity differences between collecting cylinder and cladding tube without this resulting in an excessively large step at the contact surface. This is because a transition zone with an adapted viscosity at the contact surface is created which counteracts deformations and contributes to maintaining the structure of the anti-resonance elements.

In a preferred method, it is provided that the viscosity in the region of the collecting cylinder inner side has a value $\eta(Z)$, and that the viscosity in the region of the cladding tube outer side has a value $\eta(M)$, wherein, at a measuring temperature of 1250° C., the following applies for the viscosity values (when the viscosity is specified as a logarithmic value in dPa·s): $\eta(M)=\eta(Z)\pm0.5$ dPa·s, preferably $\eta(M)=\eta(Z)\pm0.3$ dPa·s.

The viscosity on the cladding tube outer lateral surface $\eta(M)$ is in as narrow a band as possible around the viscosity value $\eta(Z)$ of the collecting cylinder in the region of its inner lateral surface. Here $\eta(M)$ is preferably greater than $\eta(Z)$ in addition.

It has also proven successful if the viscosity profile in the collecting cylinder wall increases from a viscosity minimum $\eta(Z_{min})$ toward the collecting cylinder inner side.

A radial viscosity profile with a viscosity minimum in the cylinder wall is achieved, for example, by introducing dopants into the glass of the collecting cylinder, which dopants lower the viscosity of the glass and can at least partially escape during heating. Fluorine, chlorine and/or hydroxyl groups are preferably used here. The collecting cylinder is therefore preferably made of quartz glass, the viscosity profile of the collecting cylinder being produced by adding at least one dopant lowering the viscosity of quartz glass, the dopant preferably containing fluorine, chlorine and/or hydroxyl groups.

It has proven to be particularly advantageous if the quartz glass of the collecting cylinder contains fluorine as a dopant in a concentration between 500 and 8000 ppm by weight.

It has also proven to be advantageous if there is a large difference between the viscosity minimum and the viscosity of the sheath tube in the region of the contact surface because this represents as measure for the otherwise (except for the contact surface) desirable viscosity difference between the cladding tube and the collecting cylinder. Thus the following preferably applies to the viscosity minimum $\eta(Z_{min})$ at a measuring temperature of 1250° C. (when the viscosity is specified as a logarithmic value): $\eta(M)-\eta(Z_{min})>0.8$ dPa·s, preferably >1 dPa·s.

In another preferred method variant, the cladding tube has a radial viscosity profile between its cladding tube outer side and its cladding tube inner side, in which profile viscosity gradually increases toward the inside.

In order to adjust the viscosity gradient within the cladding tube wall, it has proven successful if the cladding tube is made of quartz glass and fluorine is used as a dopant in a concentration of between 500 and 8000 ppm by weight.

In this context, it has proven effective if the cladding tube has a viscosity profile with a viscosity maximum $\eta(M_{max})$ and in that in method step (b) at least some of the anti-resonance element preforms or of the precursors for anti-resonance elements are present as tubular anti-resonance element preforms, which are preferably composed of a plurality of nested structural elements, comprising an ARE outer tube and an ARE inner tube inserted therein, and in that the anti-resonance element preforms are made of quartz glass which, at a measuring temperature of 1250° C., has a viscosity at least 0.4 dPa·s higher than the maximum viscosity $\eta(M_{max})$ of the quartz glass of the cladding tube, preferably a viscosity at least 0.5 dPa·s higher (when viscosity is indicated as a logarithmic value).

In the preferred case, the collecting cylinder and the cladding tube are made of quartz glass. Fluorine doping of the additional sheath material provided by the collecting cylinder enables a substantial decrease in viscosity relative to the quartz glass of the cladding tube, even when the quartz glass of the cladding tube itself does not contain any dopant. It has proven to be advantageous for the quartz glass of the cladding tube at a measurement temperature of 1250° C. to have a viscosity at least 0.5 dPa·s higher than the quartz glass of the additional sheath material, preferably a viscosity at least 0.6 dPa·s higher. The viscosity differences are given here and below as a logarithmic viscosity value in dPa·s.

In an advantageous procedure, all preform components of the preform consist of different quartz glass grades, wherein in a first approximation the viscosity of the quartz glass grades increases from the outside to the inside. Other dopants, such as $Al_2O_3$, nitrogen, chlorine and hydroxyl groups, can also be used for viscosity adjustment. In the simplest case, however, it will be sufficient if only the additional sheath material is made of quartz glass containing fluorine.

In a further preferred procedure, at least some of the precursors for anti-resonance elements are present as tubular anti-resonance element preforms, which are preferably composed of several structural elements nested within each other, comprising an ARE outer tube and an ARE inner tube inserted therein, the anti-resonance element preforms being made of quartz glass which, at a measuring temperature of 1250° C., has a viscosity at least 0.4 dPa·s higher than the quartz glass of the cladding tube, preferably a viscosity at least 0.5 dPa·s higher.

The quartz glass of the ARE outer tube may contain a dopant that increases the viscosity, such as nitrogen or $Al_2O_3$. However, it has proven to be particularly advantageous if the cladding tube is made of quartz glass that contains a dopant which lowers the viscosity of quartz glass.

With regard to a high thermal stability of the ARE inner tubes in the case of nested structural elements, it has proven effective if at least some of the ARE inner tubes, preferably all of the ARE inner tubes, are made of quartz glass which, at a measuring temperature of 1250° C., has a viscosity at least 0.4 dPa·s higher than the quartz glass of the ARE outer tube, preferably a viscosity at least 0.5 dPa·s higher.

The cladding tube is preferably produced in a vertical drawing method without a molding tool with a two-stage elongation process. In the first stage, a hollow starting cylinder made of glass is mechanically processed to set the final dimensions of the hollow starting cylinder. In a first elongation process with a vertically oriented longitudinal axis, the starting cylinder is continuously fed into a heating zone having a first heating zone length, softens therein in regions, and an intermediate cylinder is drawn from the softened region. In a second elongation process with a vertically oriented longitudinal axis, said starting cylinder is continuously fed into another heating zone with a second, shorter heating zone length, softens therein in regions, and a continuous tube is drawn from the softened region. The cladding tube is obtained from the continuous tube by cutting it to length.

By using preform components having a low viscosity, in particular in the outer sheath region, the method according to the invention makes it possible to use comparatively large preforms for thermal processing.

In view of this, a secondary preform is preferably formed which has an outer diameter in the range of 30 to 90 mm and/or a primary preform is formed which has an outer diameter in the range of 20 mm to 70 mm, preferably in the range of 30 to 70 mm.

The preform outer diameter in the range of 30 to 90 mm is large compared to the current prior art. Because the absolute geometry error present during fiber drawing is scaled down more strongly as the outer diameter of the preform increases, a more precise production of the hollow-core fiber is also made possible in principle when a large preform is used. However, with diameters greater than 90 mm, temperature gradients form within the preform volume in the fiber-drawing process which can result in deviations in wall thickness for the anti-resonance elements in the hollow-core fiber. In the case of preform outer diameters of less than 30 mm, no particular contribution results from scaling down the geometry error. Moreover, it is advantageous to form a large primary preform the outer diameter of which is in the range from 20 to 70 mm, preferably in the range from 30 to 70 mm. This is a comparatively large outer diameter. In the prior art, the outer diameters of the primary preforms are typically 4 to 6 mm.

In a preferred method variant, the formation of preforms for anti-resonance elements according to method step (b) comprises arranging the anti-resonance element preforms in desired positions on the inside of the cladding tube wall, a positioning template being used for arranging the holding elements for positioning the anti-resonance element preforms in the desired positions.

The positioning template has, for example, a shaft projecting into the inner bore of the cladding tube, which shaft is provided with holding elements in the form of a plurality of holding arms pointing radially outwards.

The structurally predetermined star-shaped arrangement of the holding elements facilitates the exact positioning of the anti-resonance element preforms in the respective desired positions and their fastening. In this case, the positioning template is preferably used exclusively in the region of the end faces of the cladding tube, preferably in the region of both cladding tube end faces.

The accuracy of the positioning of the preforms on the inner lateral surface of the cladding tube is improved by producing the inner side of the cladding tube by machining, in particular by drilling, milling, grinding, honing and/or polishing.

In a preferred method, the accuracy of the positioning of the preforms in the cladding tube is further improved in that tubular structural elements are provided, of which at least some have a wall thickness in the range of 0.2 and 2 mm, preferably a wall thickness in the range of 0.25 and 1 mm, and wherein a cladding tube with an external diameter in the range of 90 and 250 mm, and preferably with an external diameter in the range of 120 to 200 mm, is provided. These components each have a length of at least 1 m. They are relatively high-volume structural elements for forming anti-resonance elements. This simplifies handling. In addition, with a vertical arrangement of cladding tube and structural elements, gravitational force supports the parallelism and vertical alignment of the longitudinal axes of the structural elements when the structural elements are each positioned and fastened in the desired position at their upper end, for example and preferably using the sealing or bonding compound explained in detail above and, additionally or alternatively thereto, by means of the positioning template described in detail above.

With regard to the production of the preform for the hollow-core fiber, the aforementioned technical object is achieved according to the invention starting from a method of the species mentioned at the outset according to the invention in that In order to further process the primary preform according to method step (c), a collecting cylinder is used which has a radial viscosity profile in which viscosity increases toward the collecting cylinder inner side.

The preform is a starting point for the production of the anti-resonant hollow-core fiber. By elongating the preform, either the anti-resonant hollow-core fiber is drawn directly or a semi-finished product is first produced from which the anti-resonant hollow-core fiber is subsequently drawn. The production of the preform includes collapsing additional sheath material onto the primary preform, a collecting cylinder being used for this purpose which has a radial viscosity profile in which viscosity increases toward the collecting cylinder inner side.

This makes it possible to maintain viscosity differences between collecting cylinder and cladding tube without this resulting in an excessively large step at the contact surface. Measures for producing the preform are explained above in connection with the production of the hollow-core fiber, and these explanations are included herewith.

Definitions

Individual method steps and terms of the above description are additionally defined below. The definitions form part of the description of the invention. That which is expressed in the description is definitive in the event of a factual contradiction between one of the following definitions and the remaining description.

Anti-Resonance Elements

The anti-resonance elements may be simple or nested structural elements of the hollow-core fiber. They have at least two walls that, when viewed from the direction of the hollow core, have a negative curvature (convex) or do not have a curvature (planar, straight). They generally consist of a material that is transparent to the working light, for example glass, in particular doped or undoped $SiO_2$, a plastic, in particular a polymer, a composite material or crystalline material.

Anti-Resonance Element Preform/Anti-Resonance Element Precursor

What are referred to as anti-resonance element preforms are components or constituents of the preform that essentially become anti-resonance elements in the hollow-core fiber by simple elongation during the fiber-drawing process. Components or constituents of the preform that become anti-resonance element preforms only upon forming or that become anti-resonance elements directly are referred to as anti-resonance element precursors. The anti-resonance element preforms may be simple or nested components to which additional positioning aids can be fixed. They are originally present in the primary preform.

Nested anti-resonance element preforms form nested anti-resonance elements in the hollow-core fiber. They are composed of an outer tube and at least one further structural element that is arranged in the inner bore of the outer tube. The further structural element can be a further tube which bears against the inner lateral surface of the outer tube. The outer tube is referred to as an "anti-resonance element outer tube" or an "ARE outer tube" for short, and the further tube is referred to as an "anti-resonance element inner tube" or an "ARE inner tube" for short, or also as a "nested ARE inner tube."

In the case of multi-nested anti-resonance element preforms, at least one further structural element, for example a third tube abutting against the inner lateral surface of the nested ARE inner tube, can be arranged in the inner bore of the nested ARE inner tube. Where there are multi-nested anti-resonance element preforms, in order to distinguish between the multiple tubes that are arranged within the ARE outer tube, a distinction can optionally be made between "outer nested ARE inner tube" and "inner nested ARE inner tube."

The term "cross-section" in conjunction with cylindrical anti-resonance element preforms and their cylindrical structural elements always refers to the cross-section perpendicular to the respective longitudinal axis of the cylinder, namely, unless otherwise indicated, the cross-section of the outer contour in tubular components (not the cross-section of the inner contour).

Further processing of the primary preform, in particular by hot-forming steps, can result in intermediate products, in which the original anti-resonance element preforms are present in a shape that has been modified compared to the original shape. The modified shape is also referred to herein as an anti-resonance element preform or as an anti-resonance element precursor.

Preform/Primary Preform/Secondary Preform/Core Preform (Cane)

The preform is the component from which the anti-resonant hollow-core fiber is drawn. It is a primary preform or a secondary preform produced by further processing of the primary preform. The primary preform can be present as an ensemble consisting of at least one cladding tube and preforms or precursors for anti-resonance elements that are loosely accommodated or firmly fixed therein. The further processing of the primary preform into a secondary preform from which the hollow-core fiber is drawn can comprise a single or repeated performance of one or more of the following hot-forming processes:
 (i) elongation,
 (ii) collapse,
 (iii) collapse and simultaneous elongation,
 (iv) collapse of additional sheath material,
 (v) collapse of additional sheath material and subsequent elongation,
 (vi) collapse of additional sheath material and simultaneous elongation.

A preform obtained by collapsing and/or elongating a primary preform is referred to in the literature as a cane. Typically, it is overlaid with additional sheath material before or during drawing of the hollow-core fiber.

Elongating/Collapsing

During elongation, the primary preform is lengthened. The lengthening can take place without simultaneous collapse. Elongation can take place true to scale, so that, for example, the shape and arrangement of components or constituents of the primary preform is reflected in the elongated end product. During elongation, however, the primary preform can also be drawn not true to scale and its geometry can be modified.

During collapse, an inner bore is narrowed or annular gaps between tubular components are closed or narrowed. Collapse is generally accompanied by elongation.

Hollow Core/Inner Sheath Region/Outer Sheath Region

The ensemble comprising at least one cladding tube and therein loosely accommodated or firmly fixed preforms or precursors for anti-resonance elements is also referred to herein as "primary preform." The primary preform comprises the hollow core and a sheath region.

This sheath region is also referred to as an "inner sheath region" if there is also an "outer sheath region" that has been produced, for example, by collapsing onto the ensemble, and if a distinction is to be made between said sheath regions. The terms "inner sheath region" and "outer sheath region" are also used for the corresponding regions in the hollow-core fiber or in intermediate products obtained by further processing of the primary preform.

The designation "inner side of the tube" is also used as a synonym for "inner lateral surface of the tube" and the designation "outer side of the tube" is also used as a synonym for "outer lateral surface of the tube." The term "inner bore" in conjunction with a tube does not mean that the inner bore has been produced by a drilling process.

Machining

This refers to separating mechanical manufacturing methods for the separating processing of a workpiece, in particular turning, cutting, drilling, sawing, milling and grinding. This machining creates a longitudinal structure extending in the direction of the longitudinal axis of the cladding tube, which serves as a positioning aid for the anti-resonance element preforms. The longitudinal structure is accessible from the inner side of the cladding tube; it can also extend through the entire cladding tube wall to the outer side.

Particle Size and Particle Size Distribution

Particle size and particle size distribution of the $SiO_2$ particles are characterized using the $D_{50}$ values. These values are taken from particle size distribution curves showing the cumulative volume of $SiO_2$ particles as a function of the particle size. The particle size distributions are often characterized on the basis of the respective $D_{10}$, $D_{50}$ and $D_{90}$ values. In this case, the $D_{10}$ value characterizes the particle size that is not achieved by 10% of the cumulative volume of the $SiO_2$ particles, and accordingly, the $D_{50}$ value and the $D_{00}$ value characterize the particle sizes that are not achieved by 50% and by 90%, respectively, of the cumulative volume of the $SiO_2$ particles. The particle size distribution is determined by scattered light and laser diffraction spectroscopy according to ISO 13320.

EXEMPLARY EMBODIMENT

Figure 2:
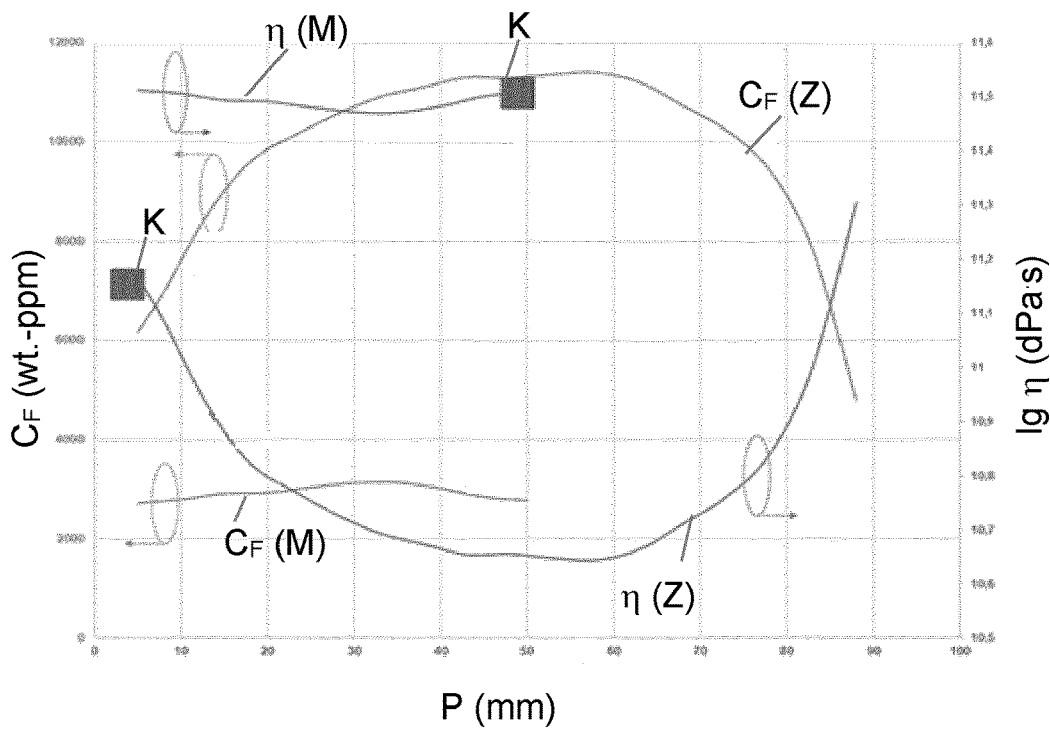
Figure 3:
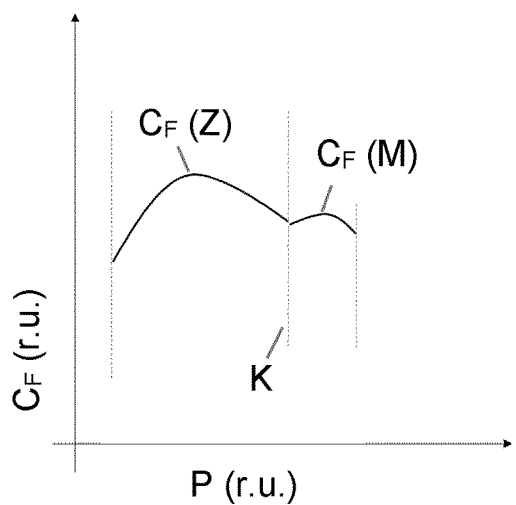

The invention is explained in more detail below with reference to an exemplary embodiment and a drawing. The following are shown in detail in schematic representation:

FIG. 1 a coaxial tube arrangement of a collecting cylinder and a primary preform which is composed of a cladding tube and anti-resonance element preforms positioned and fastened therein based on a view of the radial cross-section, FIG. 2 a diagram for the radial course of fluorine concentration and viscosity in the collecting cylinder and in the cladding tube, and FIG. 3 a sketch to explain an ideal radial concentration or viscosity profile of a preform for a hollow-core fiber.

In the production of the hollow-core fiber or the preform for the hollow-core fiber, a plurality of components is to be connected together. In addition, it can be helpful to seal existing gaps or channels of the preform when carrying out hot-forming processes. For bonding or sealing, a sealing or bonding compound based on $SiO_2$ and as disclosed in DE 10 2004 054 392 A1 is used. In this case, an aqueous slip containing amorphous $SiO_2$ particles having a particle size distribution characterized by a $D_{50}$ value of about 5 µm and by a $D_{90}$ value of about 23 µm is produced by wet milling silica glass grain. Further amorphous $SiO_2$ grains with an average grain size of about 5 µm are mixed with the base slip. The slip used as a bonding compound has a solid content of 90%, which consists of at least 99.9 wt. % $SiO_2$.

FIG. 1 schematically shows the coaxial tube arrangement 1 with a collecting cylinder 2, a cladding tube 3 having a cladding tube wall, on the inner side of which are fixed, at a uniform distance, anti-resonance element preforms 4 at previously defined azimuthal positions; in the exemplary embodiment, there are six preforms 4; in another preferred embodiment (not shown), there is an odd number of preforms.

The cladding tube 3 has an outer diameter of 27 mm and an inner diameter of 20 mm. The anti-resonance element preforms 4 are present as an ensemble of nested structural elements consisting of an ARE outer tube 4a and an ARE inner tube 4b. The ARE outer tube 4a has an outer diameter of 6.2 mm and the ARE inner tube 4b has an outer diameter of 2.5 mm. The wall thickness of both structural elements (4a; 4b) is equal and is 0.3 mm. All tubular components 2, 3, 4a, 4b have a length of 700 mm.

The anti-resonance element preforms 4 are fastened to the inner wall of the cladding tube 3 by means of the bonding compound based on $SiO_2$. The bonding compound is applied locally to the inner lateral surface of the cladding tube in the region of the ends, and the anti-resonance element preforms 4 are placed thereon using a positioning template with a structurally predetermined star-shaped arrangement of holding arms for the individual anti-resonance element preforms 4. In this case, the effect of the positioning template is limited to the region around the two ends of the cladding tube. This method creates a precise and reproducible connection between the cladding tube 3 and the anti-resonance element preforms 4. Solidification of the bonding compound at a low temperature below 300° C. is sufficient for fastening, so that an intense heating of the surrounding regions and thus a deformation of anti-resonance element preforms 4 is avoided.

The primary preform thus obtained is overlaid by the collecting cylinder 2 made of quartz glass. The collecting cylinder 2 has an outer diameter of 63.4 mm and a wall thickness of 17 mm. When the collecting cylinder 2 collapses onto the cladding tube 3, the coaxial tube arrangement is simultaneously elongated. For this purpose, the coaxial tube arrangement of the cladding tube 3 and the collecting cylinder 2 coming from below in a vertically oriented longitudinal axis is fed into a temperature-controlled heating zone and softens therein zone by zone starting with the upper end of the tube arrangement. The heating zone is kept at a desired temperature of 1580° C. with a control accuracy of +/−0.1° C. Temperature fluctuations in the hot-forming process can thereby be limited to less than +/−0.5° C.

The secondary preform formed in the collapse and elongation process has an outer diameter of approximately 50 mm and a sheath wall thickness of 16.6 mm composed of an outer sheath and an inner sheath. It is subsequently drawn into the anti-resonant hollow-core fiber. All anti-resonance element preforms are sealed beforehand with the sealing or bonding compound. The sealing compound is applied only to the end face of the anti-resonance element preforms that faces upward during the fiber drawing process. This end face is joined to a holding tube made of quartz glass which simultaneously serves as a gas connection. The holder is fastened to the collecting cylinder 2 and to the cladding tube 3 by means of the sealing or bonding compound.

In the fiber-drawing process, the secondary preform is in the case of a vertically oriented longitudinal axis fed from above into a temperature-controlled heating zone and softens therein zone by zone starting at the lower end. At the same time, gas is supplied to the core region (hollow core) so that an internal pressure of 4 mbar is established in the core region. The heating zone is kept at a desired temperature of approximately 2080° C. with a control accuracy of +/−0.1° C. Temperature fluctuations in the hot-forming process can thereby be limited to less than +/−0.5° C.

By drawing the preform into the hollow-core fiber, the absolute geometry error present is scaled down, so that the anti-resonance elements obtained from the anti-resonance element preforms in the hollow-core fiber have a maximum deviation of less than 3.5% in wall thickness (with respect to an average wall thickness).

The slight error in wall thickness is attributed, on the one hand, to the use of the comparatively large secondary preform and the accompanying scaling down of the original absolute geometry deviations that are present and, on the other hand, to comparatively low processing temperatures during the hot-forming processes (elongating and collapsing, fiber drawing). The lower processing temperatures are, in turn, attributable to the fact that the collecting cylinder 2 and the cladding tube 3 consist of quartz glass doped with fluorine. In the coaxial arrangement 1, these components represent the components with the greatest surface area and were instrumental in determining the processing temperature. As a result of the fluorine doping of the components with the greatest surface area of the secondary preform, the necessary processing temperature can be reduced, and the relative stiffness and thermal stability of the anti-resonance element preforms 4 lying further inward can thus be indirectly improved by exposing them to a lower temperature in the hot-forming process. Table 1 below summarizes details of the materials of the components of the coaxial arrangement or of the secondary preform.

TABLE 1

| Reference numeral in FIG. 1 | Name/function | Material |
|---|---|---|
| 2 | Collecting cylinder | Flzuorine-doped quartz glass 10 000 ppm by weight |
| 3 | Cladding tube | Fluorine-doped quartz glass 2700 ppm by weight |
| 4a | ARE outer tube | Undoped quartz glass |
| 4b | ARE inner tube | Undoped quartz glass |

The quartz glass tubes (2; 3) doped with fluorine have a fluorine concentration profile with a maximum fluorine concentration in the center of the tube wall. The data regarding the fluorine concentration of the quartz glass that are given in the "Material" column of Table 1 are mean values.

The diagram in FIG. 2 shows measured fluorine concentration profiles C (in ppm by weight) for a cladding tube $C_F(M)$ and in the case of a collecting cylinder $C_F(Z)$", as well as viscosity profiles η (in log dPa·s) along the radial spatial coordinate (position P (in mm)) calculated from the concentration profiles for a temperature of 1250° C.

The fluorine concentration curve in quartz glass is determined by infrared spectroscopy. Viscosity scales with the fluorine concentration for a given temperature and is calculated starting from a basic value for undoped quartz glass (η=11.8 dPa·s (corresponding to 100%)) using the following formula:

decrease in viscosity at 1250° C.: 12% (±2%) wt. % fluorine.

Table 2 shows viscosity values for fluorine concentrations of commercially available quartz glass grades (for a measuring temperature of 1250° C.).

TABLE 2

| Fluorine content [wt. ppm] | log η @ 1250° C. [dPa*s] |
|---|---|
| 0 | 11.80 |
| 4800 | 11.00 |
| 10 000 | 10.50 |
| 13 000 | 9.80 |

The diagram in FIG. 2 shows that the viscosity of the collecting cylinder η(Z) is lower than that of the cladding tube η(M). In both quartz glass tubes, the viscosity at the center of the tube has a minimum, which is approximately $10^{11.45}$ dPa·s in the cladding tube and for the collecting tube is approximately $10^{10.65}$ dPa·s. The difference in viscosity of the minima (in log dPa·s) is thus approximately 0.80 dPa·s. The difference between the viscosity of the cladding tube in the region of the cladding tube outer side (approximately $10^{15}$ dPa·s) and the viscosity minimum for the capture cylinder is approximately 0.85 (in log dPa·s).

In the preform, the outer lateral surface of the cladding tube and the inner lateral surface of the collecting cylinder form a common contact surface. The spatial position of the contact surface transferred to the viscosity profiles is indicated in the diagram by the two rectangles "K." The following values result at these positions for the viscosities of the collecting cylinder and the cladding tube:

| Cladding tube: | approximately 11.5 | log(dPa · s) |
| Collecting cylinder: | approximately 11.15 | log(dPa · s) |

The viscosity difference in the region of the contact surface is thus approximately 0.35 (in log dPa·s).

The structural elements (4a; 4b) of the anti-resonance element preforms (4) consist of undoped quartz glass and have a viscosity of about $10^{11.8}$ dPa·s.

The diagram in FIG. 3 shows in idealized form the radial concentration curve for dopant over the wall of the secondary preform. On the y-axis, the fluorine concentration $C_F$ (in relative units) is plotted against the spatial coordinate P (in relative units). At the contact surface "K," the dopant concentration $C_F(Z)$ of the fluorine-doped quartz glass originating from the collecting cylinder is ideally as high as the concentration $C_F(M)$ of the fluorine-doped quartz glass originating from the cladding tube. The corresponding viscosity profile of the viscosities of the cladding tube and the collecting cylinder thus exhibits the same viscosity at the contact surface K on both sides.

The invention claimed is:

1. A method for producing an anti-resonant hollow-core fiber comprising a hollow core extending along a longitudinal axis of the fiber and an inner sheath region surrounding the hollow core, which sheath region comprises a plurality of anti-resonance elements, comprising the method steps of:
   (a) providing a primary preform for a hollow-core fiber which comprises at least one cladding tube having a cladding tube inner bore and a cladding tube longitudinal axis along which a cladding tube wall delimited by an inner side and an outer side extends,
   (b) forming a number of precursors or preforms for anti-resonance elements in desired positions of the cladding tube wall, and
   (c) further processing the primary preform to form a secondary preform from which the hollow-core fiber is drawn, the further processing comprising a single or repeated collapse of additional sheath material in the form of a collecting cylinder, the collecting cylinder having a collecting cylinder inner side facing the cladding tube, a collecting cylinder outer side and a collecting cylinder wall therebetween, wherein the collecting cylinder has a radial viscosity profile in which viscosity increases toward the collecting cylinder inner side.

2. The method according to claim 1, wherein the viscosity in the region of the collecting cylinder inner side has a value η(Z), and the viscosity in the region of the cladding tube outer side has a viscosity η(M), wherein, at a measuring temperature of 1250° C., the following applies for the viscosity values (when viscosity is specified as a logarithmic value in dPa·s): η(M)=η(Z)±0.5 dPa·s.

3. The method according to claim 2, wherein the following applies at a measuring temperature of 1250° C. for the viscosity values (when viscosity is specified as a logarithmic value in dPa·s): η(M)=η(Z)±0.3 dPa·s.

4. The method according to claim 1, wherein the viscosity profile in the collecting cylinder wall increases from a viscosity minimum η($Z_{min}$) toward the collecting cylinder inner side.

5. The method according to claim 4, wherein the following applies for the viscosity minimum η($Z_{min}$) at a measuring temperature of 1250° C. (when the viscosity is specified as a logarithmic value): η(M)−η($Z_{min}$)>0.8 dPa·s.

6. The method according to claim 5, wherein the following applies for the viscosity minimum η($Z_{min}$) at a measuring temperature of 1250° C. (when the viscosity is specified as a logarithmic value): η(M)−η($Z_{min}$)>1 dPa·s.

7. The method according to claim 1 wherein the cladding tube has a radial viscosity profile between its cladding tube outer side and its cladding tube inner side in which the viscosity gradually increases toward the inner side.

8. The method according to claim 7, wherein the cladding tube is made of quartz glass and the radial viscosity profile has a maximum viscosity η($M_{max}$) and in method step (b) at least some of the anti-resonance element preforms or of the precursors for anti-resonance elements are present as tubular anti-resonance element preforms, which are composed of a plurality of nested structural elements, comprising an ARE outer tube and an ARE inner tube inserted therein, and the anti-resonance element preforms are made of quartz glass which, at a measuring temperature of 1250° C., has a viscosity at least 0.4 dPa·s higher than the maximum viscosity η($M_{max}$) of the quartz glass of the cladding tube (when the viscosity is given as a logarithmic value).

9. The method according to claim 8, wherein the anti-resonance element preforms are made of quartz glass which, at a measuring temperature of 1250° C., has a viscosity at least 0.5 dPa·s higher than the maximum viscosity $\eta(M_{max})$ of the quartz glass of the cladding tube (when the viscosity is given as a logarithmic value).

10. The method according to claim 1 wherein the collecting cylinder is made of quartz glass and the radial viscosity profile of the collecting cylinder is produced by adding at least one dopant lowering the viscosity of quartz glass.

11. The method according to claim 10, wherein the dopant contains fluorine, chlorine and/or hydroxyl groups.

12. The method according to claim 1, wherein the cladding tube is made of quartz glass and a viscosity profile of the cladding tube is produced by adding at least one dopant lowering the viscosity of quartz glass.

13. The method according to claim 12, wherein the dopant contains fluorine, chlorine and/or hydroxyl groups.

14. The method according to claim 13, wherein the quartz glass of the cladding tube contains fluorine as dopant in a concentration of between 500 and 8000 ppm by weight.

15. The method according to claim 11, wherein the quartz glass of the collecting cylinder contains fluorine as dopant in a concentration of between 500 and 8000 ppm by weight.

16. The method according to claim 1, wherein the cladding tube is produced in a vertical drawing method without a molding tool with a two-stage elongation process, in the first stage, a hollow starting cylinder made of glass being mechanically processed to set the final dimensions of the hollow starting cylinder, the starting cylinder in a first elongation process with a vertically oriented longitudinal axis being continuously fed into a first heating zone with a first heating zone length, being softened therein in a first softened region and an intermediate cylinder being drawn from the first softened region, the intermediate cylinder with a vertically oriented longitudinal axis being fed in a second elongation process into a second heating zone with a second, shorter heating zone length, being softened therein in a second softened region and a continuous tube being drawn from the second softened region, and the cladding tube being obtained from the continuous tube by cutting it to length.

17. The method according to claim 1, wherein a secondary preform is formed which has an outer diameter in the range of 30 to 90 mm and/or a primary preform is formed which has an outer diameter in the range of 20 mm to 70 mm.

18. The method according to claim 1, wherein the formation of preforms for anti-resonance elements according to method step (b) comprises arranging the anti-resonance element preforms at desired positions on the inner side of the cladding tube wall, a positioning template being used for the arrangement which has holding elements for positioning the anti-resonance element preforms in the desired positions.

19. A method for producing a preform for an anti-resonant hollow-core fiber comprising a hollow core extending along a longitudinal axis of the fiber and an inner sheath region surrounding the hollow core, which sheath region comprises a plurality of anti-resonance elements, comprising the method steps of:

(a) providing a primary preform for a hollow-core fiber which comprises at least one cladding tube having a cladding tube inner bore and a cladding tube longitudinal axis along which a cladding tube wall delimited by an inner side and an outer side extends, (b) forming a number of precursors or preforms for anti-resonance elements at desired positions on the cladding tube wall, and (c) further processing the primary preform to form a secondary preform for the hollow-core fiber, the further processing comprising a single or repeated collapse of additional sheathing material in the form of a collecting cylinder, the collecting cylinder having a collecting cylinder inner side facing the cladding tube, a collecting cylinder outer side and a collecting cylinder wall therebetween, wherein the collecting cylinder has a radial viscosity profile in which viscosity increases toward the collecting cylinder inner side.

20. A method for producing an anti-resonant hollow-core fiber comprising a hollow core extending along a longitudinal axis of the fiber and an inner sheath region surrounding the hollow core, which sheath region comprises a plurality of anti-resonance elements, comprising the method steps of:

(a) providing a primary preform for a hollow-core fiber which comprises at least one cladding tube having a cladding tube inner bore and a cladding tube longitudinal axis along which a cladding tube wall delimited by an inner side and an outer side extends, (b) forming a number of precursors or preforms for anti-resonance elements in desired positions of the cladding tube wall, and (c) further processing the primary preform to form a secondary preform from which the hollow-core fiber is drawn, the further processing comprising a single or repeated collapse of additional sheath material in the form of a collecting cylinder, the collecting cylinder having a collecting cylinder inner side facing the cladding tube, a collecting cylinder outer side and a collecting cylinder wall therebetween, wherein the collecting cylinder has a radial viscosity profile in which viscosity increases toward the collecting cylinder inner side, wherein the viscosity in the region of the collecting cylinder inner side has a value $\eta(Z)$, and the viscosity in the region of the cladding tube outer side has a viscosity $\eta(M)$, wherein, at a measuring temperature of 1250° C., the following applies for the viscosity values (when viscosity is specified as a logarithmic value in dPa·s): $\eta(M)=\eta(Z)\pm0.5$ dPa·s, wherein the viscosity profile in the collecting cylinder wall increases from a viscosity minimum $\eta(Z_{min})$ toward the collecting cylinder inner side, and wherein the cladding tube has a radial viscosity profile between its cladding tube outer side and its cladding tube inner side in which the viscosity gradually increases toward the inner side.

* * * * *